(12) United States Patent  
Sato et al.

(10) Patent No.: US 9,991,524 B2  
(45) Date of Patent: Jun. 5, 2018

(54) FUEL CELL SEPARATOR, FUEL CELL CURRENT COLLECTOR PLATE, FUEL CELL AND FUEL CELL STACK

(71) Applicants: TOYOTA JIDOSHA KABUSHIKI KAISHA, Toyota-shi, Aichi-ken (JP); Sumitomo Riko Company Limited, Komaki-shi, Aichi (JP)

(72) Inventors: Kenji Sato, Kasugai (JP); Hiroki Itakura, Kitanagoya (JP); Takahiro Aoki, Kasugai (JP)

(73) Assignees: Toyota Jidosha Kabushiki Kaisha, Toyota-shi, Aichi-ken (JP); Sumitomo Riko Company Limited, Komaki-shi, Aichi (JP)

( * ) Notice: Subject to any disclaimer, the term of this patent is extended or adjusted under 35 U.S.C. 154(b) by 90 days.

(21) Appl. No.: 14/933,644

(22) Filed: Nov. 5, 2015

(65) Prior Publication Data

US 2016/0141637 A1  May 19, 2016

(30) Foreign Application Priority Data

Nov. 13, 2014  (JP) .................................. 2014-230402

(51) Int. Cl.
*H01M 8/02* (2016.01)
*H01M 8/0258* (2016.01)
(Continued)

(52) U.S. Cl.
CPC ....... *H01M 8/0258* (2013.01); *H01M 8/0267* (2013.01); *H01M 8/0271* (2013.01); *H01M 8/0276* (2013.01); *H01M 8/2483* (2016.02)

(58) Field of Classification Search
CPC ............. H01M 8/0258; H01M 8/0267; H01M 8/0276; H01M 8/2483
(Continued)

(56) References Cited

U.S. PATENT DOCUMENTS

2008/0081242 A1  4/2008 Sasaki et al.
2009/0239129 A1  9/2009 Seido et al.
(Continued)

FOREIGN PATENT DOCUMENTS

CA    2 617 733 A1    2/2007
CN    101964425 A     2/2011
(Continued)

*Primary Examiner* — Basia Ridley
*Assistant Examiner* — James Erwin
(74) *Attorney, Agent, or Firm* — Finnegan, Henderson, Farabow, Garrett & Dunner, LLP

(57) ABSTRACT

In a fuel cell separator and the like, a technology for reducing the separation of a flow path rib which rectifies the flow of a fluid is desired.

A separator used in a fuel cell is provided, the separator including: a separator main body that includes a fluid flow region through which a reactive gas or a coolant flows, a through-hole through which the reactive gas or the coolant flows, and a connection portion which connects the fluid flow region and the through-hole; and a flow rectifying portion that is arranged by being adhered on the connection portion and that rectifies flow of the reactive gas or the coolant between the fluid flow region and the through-hole, where the flow rectifying portion includes a plurality of protruded portions and a coupling portion which is thinner than the protruded portions and which couples the protruded portions.

2 Claims, 9 Drawing Sheets

(51) Int. Cl.
*H01M 8/0267* (2016.01)
*H01M 8/0276* (2016.01)
*H01M 8/0271* (2016.01)
*H01M 8/2483* (2016.01)

(58) Field of Classification Search
USPC .......................................................... 429/452
See application file for complete search history.

(56) References Cited

U.S. PATENT DOCUMENTS

| | | |
|---|---|---|
| 2011/0207018 A1 | 8/2011 | Nakagawa et al. |
| 2014/0099562 A1* | 4/2014 | Blanchet ............. H01M 8/0258 429/435 |
| 2014/0248549 A1* | 9/2014 | Ushio ................... H01M 8/242 429/434 |

FOREIGN PATENT DOCUMENTS

| | | |
|---|---|---|
| JP | 2007-172874 | 7/2007 |
| JP | 2008-84794 | 4/2008 |
| JP | 2011-28939 A | 2/2011 |
| WO | WO 2006/054399 A1 | 5/2006 |

\* cited by examiner

FUEL CELL SEPARATOR, FUEL CELL CURRENT COLLECTOR PLATE, FUEL CELL AND FUEL CELL STACK

CROSS-REFERENCE TO RELATED APPLICATIONS

This application claims priority to Japanese Patent Application No. 2014-230402 filed on Nov. 13, 2014, the entire disclosure of which is hereby incorporated by reference.

BACKGROUND

Field

The present invention relates to fuel cells.

Related Art

It is known that in a separator used in a fuel cell, an internal flow path along which a reactive gas or a coolant flows and a through-hole through which a reactive gas or a coolant is supplied or discharged are conventionally provided. It is proposed that in the separator, a protrusion (hereinafter referred to as a "flow path rib") for rectifying the flow of a fluid (reactive gas or coolant) between the through-hole and the internal flow path be provided (JP2007-172874A).

SUMMARY

In JP2007-172874A, the flow path rib is formed of a material different from that of a separator main body and is adhered to the separator main body. Since a pressure is applied to the flow path rib by the flow of the reactive gas or the coolant, the flow path rib may be separated from the separator main body. Hence, it is desired to develop a technology for reducing the separation of the flow path rib in a fuel cell separator.

The present invention is made to solve at least part of the foregoing problem and can realize the solution as the below aspects.

(1) According to one aspect of the present invention, a separator used in a fuel cell is provided. The separator includes: a separator main body that includes a fluid flow region through which a reactive gas or a coolant flows, a through-hole which is arranged around the fluid flow region apart from the fluid flow region and through which the reactive gas or the coolant flows and a connection portion which connects the fluid flow region and the through-hole; and a flow rectifying portion that is arranged by being adhered to the connection portion and that rectifies flow of the reactive gas or the coolant between the fluid flow region and the through-hole, where the flow rectifying portion includes a plurality of protruded portions and a coupling portion which is thinner than the protruded portions and which couples the protruded portions.

Since the separator of this aspect includes the flow rectifying portion, it is possible to rectify the flow of the fluid (the reactive gas or the coolant) between the fluid flow region and the through-hole. Since the flow rectifying portion includes the protruded portions and the coupling portion, and the protruded portions are coupled with the coupling portion, as compared with a case where the protruded portions are provided independently of each other, an adhesion area adhered to the separator main body is large, and thus it is possible to reduce separation from the separator main body by a pressure caused by the flow of the fluid.

(2) In the separator of the aspect described above, the coupling portion may be arranged on the side of the fluid flow region or the side of the through-hole with respect to the protruded portions. In this way, as compared with a case where the coupling portion is arranged between the protruded portions so as to directly connect the area between the protruded portions, it is possible to acquire the cross-sectional area of the flow path along which the fluid (the reactive gas or the coolant) flows, with the result that it is possible to reduce the inhibition of the flow of the fluid.

(3) In the separator of the aspect described above, the protruded portion may be substantially cylindrical. In this way, directionality in the flow of the fluid is not produced, and thus it is possible to diffuse the fluid in a broad direction. Here, the substantially cylindrical shape means that the planar shape is not limited to a true circular shape and includes a shape slightly falling out of the range of a true circle.

(4) In the separator of the aspect described above, the protruded portion and the coupling portion may be integrally formed of the same elastic material by injection molding. In this way, it is possible to easily form the flow rectifying portion by injection molding, and thus it is possible to reduce a molding failure.

(5) In the separator of the aspect described above, a seal portion that is formed around the through-hole and that is formed of an elastic material may be included, the flow rectifying portion may be formed of the same elastic material as the seal portion, and the seal portion and the flow rectifying portion may be simultaneously formed by injection molding. In this way, it is possible to reduce the number of manufacturing steps. Consequently, it is possible to reduce the manufacturing time and the cost.

(6) According to another aspect of the present invention, a current collector plate used in a fuel cell is provided. The current collector plate includes: a current collector plate main body that includes a coolant flow region through which a coolant flows, a through-hole which is arranged around the coolant flow region apart from the coolant flow region and through which the coolant flows, and a connection portion which connects the coolant flow region and the through-hole; and a flow rectifying portion that is arranged by being adhered to the connection portion and that rectifies flow of the coolant between the coolant flow region and the through-hole, where the flow rectifying portion includes a plurality of protruded portions and a coupling portion which is thinner than the protruded portions and which couples the protruded portions.

Since the current collector plate of this aspect includes the flow rectifying portion, it is possible to rectify the flow of the coolant between the coolant flow region and the through-hole. Since the flow rectifying portion includes the protruded portions and the coupling portion, and the protruded portions are coupled with the coupling portion, as compared with a case where the protruded portions are provided independently of each other, an adhesion area adhered to the current collector plate main body is large, and thus it is possible to reduce separation from the current collector plate main body by a pressure caused by the flow of the coolant.

The present invention can be realized in various aspects. For example, it is possible to realize the present invention in the following aspects: a fuel cell including a separator, a fuel cell stack in which a plurality of fuel cells are stacked in layers, a fuel cell stack including a current collector plate, a fuel cell system, a moving member incorporating a fuel cell system, a method of manufacturing a separator, a method of manufacturing a current collector plate, a method of manufacturing a fuel cell, and the like.

DESCRIPTION OF THE EMBODIMENTS

A. First Embodiment

A1. Configuration of a Fuel Cell Stack

Figure 1:
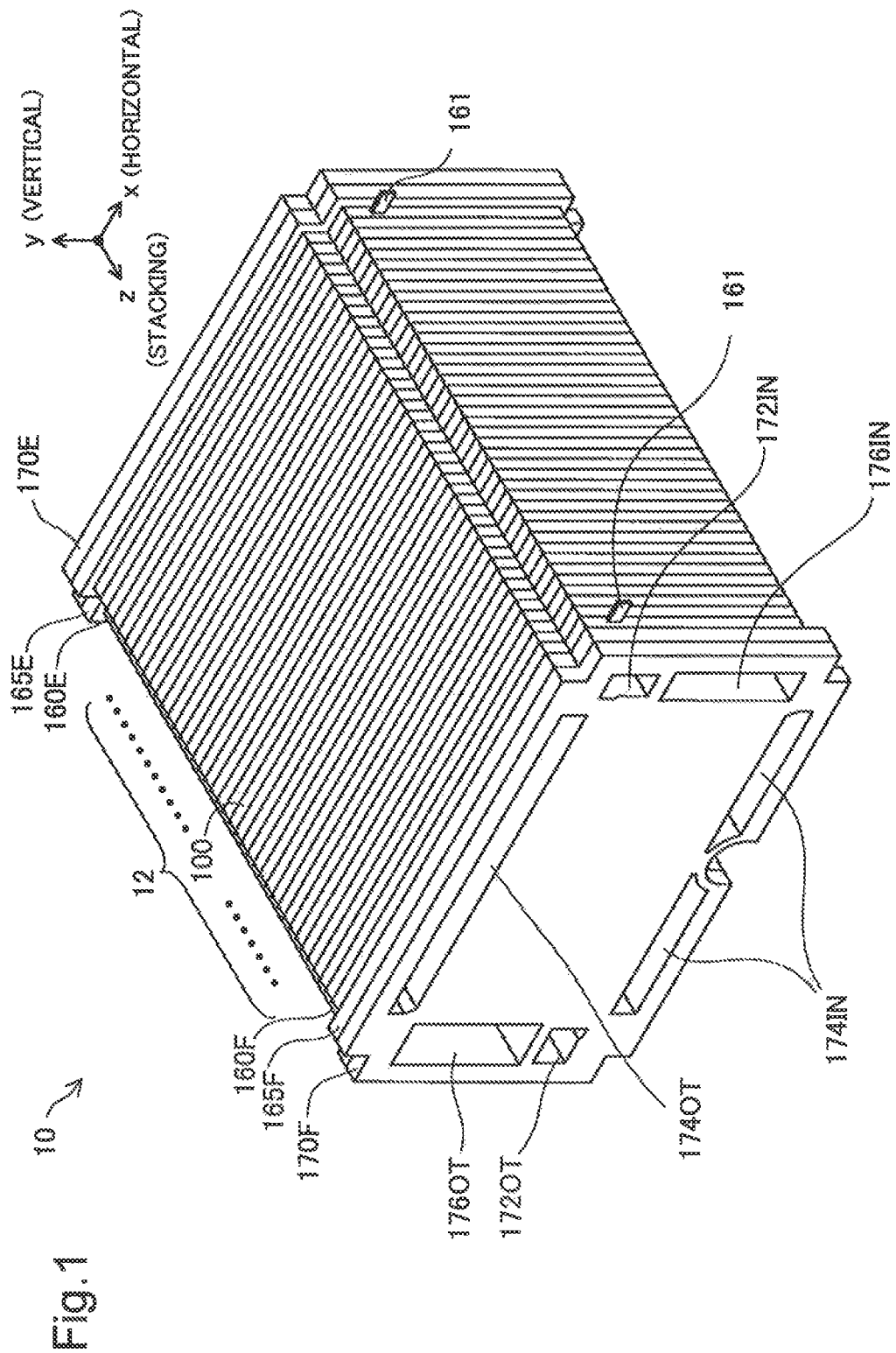
FIG. 1 is a schematic perspective view showing the configuration of a fuel cell stack 10 according to a first embodiment of the present invention.

FIG. 1 is a schematic perspective view showing the configuration of a fuel cell stack 10 according to a first embodiment of the present invention. The fuel cell stack 10 has a stack structure in which a stacked body 12 where a plurality of fuel cells 100 serving as power generation units are stacked in layers in a z direction (hereinafter also referred to as a "stacking direction") is sandwiched between end plates 170F and 170E through current collector plates 160F and 160E and insulating plates 165F and 165E. Each of the fuel cells 100, the current collector plates 160F and 160E, the insulating plates 165F and 165E and the end plates 170F and 170E has a plate structure having a substantially rectangular planar shape (where the four corners are cut into the shape of a quadrangle and the center of one long side is cut substantially in the shape of a semicircle), and the long side and the short side are arranged along an x direction (horizontal direction) and a y direction (vertical direction, perpendicular direction), respectively. In the following description, in FIG. 1, the z axis plus direction is expressed to be the front and the z axis minus direction is expressed to be the rear. In general, the fuel cell stack 10 in the present embodiment is also simply referred to as a "fuel cell".

The end plate 170F, the insulating plate 165F and the current collector plate 160F on the front end side have a fuel gas supply hole 172IN and a fuel gas discharge hole 172OT, an oxidizing gas supply hole 174IN and an oxidizing gas discharge hole 174OT and a cooling water supply hole 176IN and a cooling water discharge hole 176OT. Hereinafter, these supply holes and discharge holes are also collectively referred to as "supply discharge holes". These supply discharge holes are coupled to holes (not shown) provided in the corresponding positions of the fuel cells 100, and form the supply manifold and discharge manifold of the gases and the cooling water corresponding thereto. On the other hand, in the end plate 170E, the insulating plate 165E and the current collector plate 160E on the rear end side, these supply discharge holes are not provided. This is because the fuel cell is a type in which the reactive gases (the fuel gas and the oxidizing gas) and the cooling water are supplied from the end plate 170F on the front end side to the fuel cells 100 through the supply manifold, and the discharge gases and the discharge water from the fuel cells 100 are discharged from the end plate 170F on the front end side to the outside through the discharge manifold. However, there is no limitation on this configuration, and for example, various types can be adopted such as a type in which the reactive gases and the cooling water are supplied from the end plate 170F on the front end side, and the discharge gases and the discharge water (cooling water) are discharged from the end plate 170E on the rear end side to the outside. In the present embodiment, the cooling water is a thermal medium that heats or cools the fuel cells 100 to perform control to the intended temperature, and corresponds to a coolant in the claims.

The oxidizing gas supply hole 174IN is arranged in the outer end portion of the lower end of the end plate 170F on the front end side along the x direction (longitudinal direction), and the oxidizing gas discharge hole 174OT is arranged in the outer edge portion of the upper end along the x direction. The fuel gas supply hole 172IN is arranged in the upper end portion in the y direction (the direction of the short side) of the outer edge portion of the right end of the end plate 170F on the front end side, and the fuel gas discharge hole 172OT is arranged in the lower end portion in the y direction of the outer edge portion of the left end. The cooling water supply hole 176IN is arranged below the oxidizing gas supply hole 174IN along the y direction, and the cooling water discharge hole 176OT is arranged above the oxidizing gas discharge hole 174OT along the y direction. The supply discharge holes described above are divided into a plurality of supply discharge holes in the fuel cell 100 as will be described later.

Figure 2:
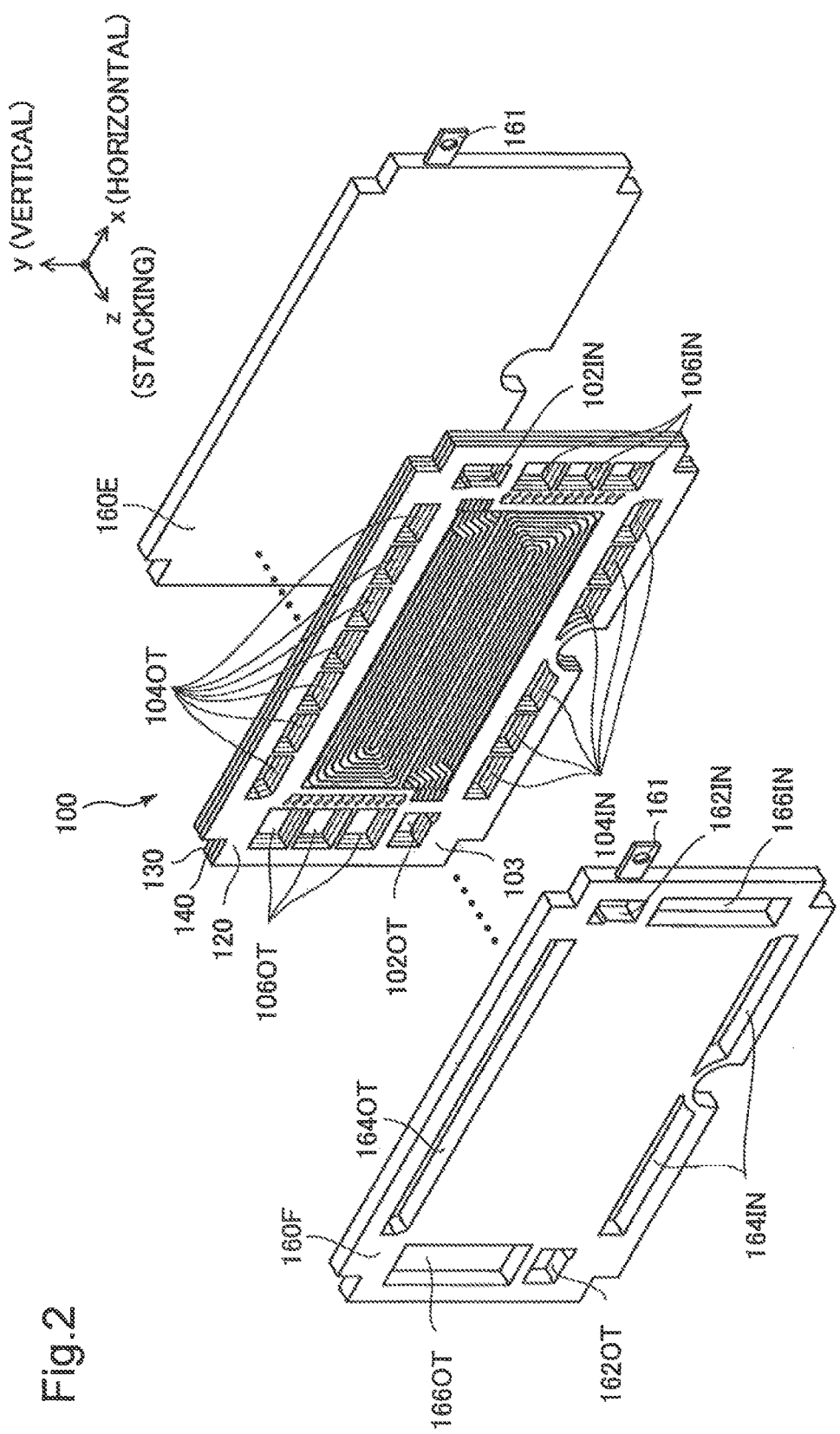
FIG. 2 is an illustrative diagram schematically showing how a current collector plate and a fuel cell are arranged.

FIG. 2 is an illustrative diagram schematically showing how the current collector plate 160F, the fuel cell 100 and the current collector plate 160E are arranged. The current collector plate 160F on the front end side and the current collector plate 160E on the rear end side collect power generated by each fuel cell 100, and outputs it through a current collector terminal 161 to the outside. As shown in the figure, the fuel cell 100 includes, in its periphery, a fuel gas supply hole 102IN and a fuel gas discharge hole 102OT, 6 oxidizing gas supply holes 104IN and 7 oxidizing gas discharge holes 104OT, 3 cooling water supply holes 106IN and 3 cooling water discharge holes 106OT. These supply discharge holes are connected to the fuel gas supply hole 172IN and the like in the end plate 170F. When a plurality of fuel cells 100 are stacked in layers to form the fuel cell stack 10, the manifold for supplying the fuel gas, the oxidizing gas and the cooling water to the fuel cells 100 and the manifold for discharging the fuel gas, the oxidizing gas and the cooling water from the fuel cells 100 are formed by these supply discharge holes.

As shown in the figure, the fuel cell 100 includes an anode-side separator 120, a cathode-side separator 130 and a seal member integrated MEA (Membrane Electrode Assembly: membrane electrode junction member) 140. In the seal member integrated MEA 140, in the outer periphery of the MEA, a frame-shaped seal member is formed integrally with the MEA. The MEA is formed by stacking, on one surface of an electrolyte membrane, an anode and anode-side diffusion layer in this order and stacking, on the other surface, a cathode and a cathode-side diffusion layer in this order. When the seal member integrated MEA 140 is sandwiched between the anode-side separator 120 and the cathode-side separator 130, the periphery portion of the fuel cell 100 is sealed with the seal member. Although in the present embodiment, the MEA is formed by joining the electrolyte membrane, a catalyst electrode and the gas diffusion layer, there is no limitation on this configuration, and the gas diffusion layer may not be included, or the gas diffusion layer may be provided separately. Although the MEA and the seal member are integrally formed, there is no limitation on this configuration, and the MEA and the seal member may be provided separately.

The anode-side separator 120 and the cathode-side separator 130 are thin steel plates made of titanium, and in the region surrounded by the supply discharge holes described above, flow paths along which the reactive gases and the cooling water are distributed are formed by press processing. Specifically, in a surface (surface shown in FIG. 2) of the anode-side separator 120 in contact with the cathode-side separator 130, a cooling water flow path is formed, and in a surface in contact with the seal member integrated MEA 140, a fuel gas flow path (not shown) is formed. In a surface (not shown) of the cathode-side separator 130 in contact with the anode-side separator 120, a cooling water flow path is formed, and in a surface in contact with the seal member integrated MEA 140, an oxidizing gas flow path (not shown) is formed. Although in the present embodiment, in each separator, the flow paths are formed, no flow path may be formed, and the fuel cell and the fuel cell stack may be formed through a flow path member provided as a separate member. The region where the flow paths are formed in the present embodiment corresponds to a fluid flow region in the claims.

The anode-side separator 120 and the cathode-side separator 130 are preferably formed with a member having a gas interruption property and electron conductivity, and the constituent material thereof is not limited to that of the present embodiment. For example, the anode-side separator 120 and the cathode-side separator 130 may be formed with a member made of carbon such as dense carbon obtained by compressing carbon particles to have a gas-impermeable property or a metal member such as a stainless steel, aluminum or an alloy thereof. Since these plates are exposed to the cooling water, a metal having a high corrosion resistance is preferably used.

A2. Configuration of the Anode-Side Separator

Figure 3:
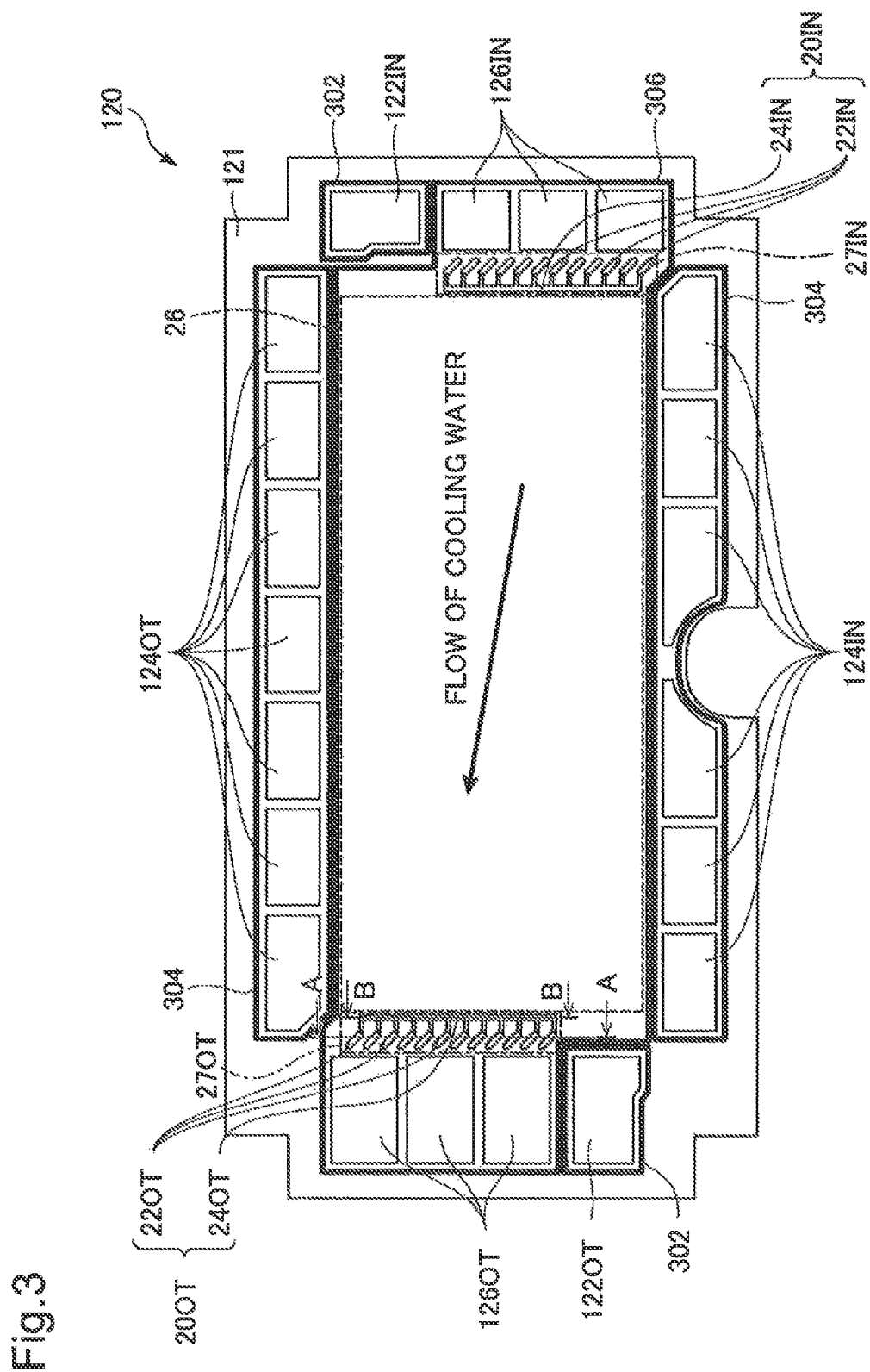
FIG. 3 is an illustrative diagram showing, in plan view, an anode-side separator of the first embodiment.

FIG. 3 is an illustrative diagram showing, in plan view, the anode-side separator. FIG. 3 shows a surface (hereinafter also referred to as a cooling surface) in which the cooling water flow path (not shown) of the anode-side separator 120 is formed. The anode-side separator 120 includes a separator main body 121 formed of titanium, seal portions 302, 304 and 306 formed of rubber and first and second flow rectifying portions 20IN and 20OT formed of the same rubber. In the present embodiment, as the rubber forming the seal portions 302, 304 and 306 and the first and second flow rectifying portions 20IN and 20OT, ethylene-propylene-diene rubber (EPDM) having a sealing property, elasticity and an adhesive property is used.

In the periphery portion of the separator main body 121, a fuel gas supply hole 122IN, a fuel gas discharge hole 122OT, an oxidizing gas supply hole 124IN, an oxidizing gas discharge hole 124OT, a cooling water supply hole 126IN and a cooling water discharge hole 126OT are formed that respectively form, in the above fuel cell 100, the fuel gas supply hole 102IN, the fuel gas discharge hole 102OT, the oxidizing gas supply hole 104IN, the oxidizing gas discharge hole 104OT, the cooling water supply hole 106IN and the cooling water discharge hole 106OT. The cooling surface of the separator main body 121 has a cooling water flow region 26 in a part surrounded by the supply discharge holes described above, and a cooling water flow path (not shown) is formed in the cooling water flow region 26. In other words, the cooling water supply hole 126IN and the cooling water discharge hole 126OT are arranged apart from the cooling water flow region 26. The cooling water supply hole 126IN and the cooling water discharge hole 126OT are connected to the cooling water flow region 26 by connection portions 27IN and 27OT (indicated by dashed lines in FIG. 3). In FIG. 3, in order for the connection portions 27IN and 27OT to be clearly shown, they are shown so as to be separate from the cooling water supply hole 126IN, the cooling water discharge hole 126OT and the cooling water flow region 26. The cooling water supplied through the cooling water supply hole 126IN is passed through the connection portion 27IN to enter the cooling water flow region 26, is flowed in the cooling water flow region 26, is passed through the connection portion 27OT and is discharged through the cooling water discharge hole 126OT to the outside. The cooling water, the cooling water flow region 26 and the cooling water supply hole 126IN and the cooling water discharge hole 126OT in the present embodiment correspond to a coolant, a fluid flow region and through-holes in the claims, respectively.

The fuel gas seal portion 302 is formed around each of the fuel gas supply hole 122IN and the fuel gas discharge hole 122OT. One oxidizing seal portion 304 is formed so as to surround 6 oxidizing gas supply holes 124IN and one oxidizing seal portion 304 is formed so as to surround 7 oxidizing gas discharge holes 124OT. One cooling water seal portion 306 is formed so as to surround the cooling water supply hole 126IN, the cooling water discharge hole 126OT, the first and second flow rectifying portions 20IN and 20OT and the cooling water flow region 26. By these seal portions 302, 304 and 306, the sealing property of the manifolds between the separators and between the separator and the current collector plate when the fuel cells 100 are stacked is acquired.

Figure 4:
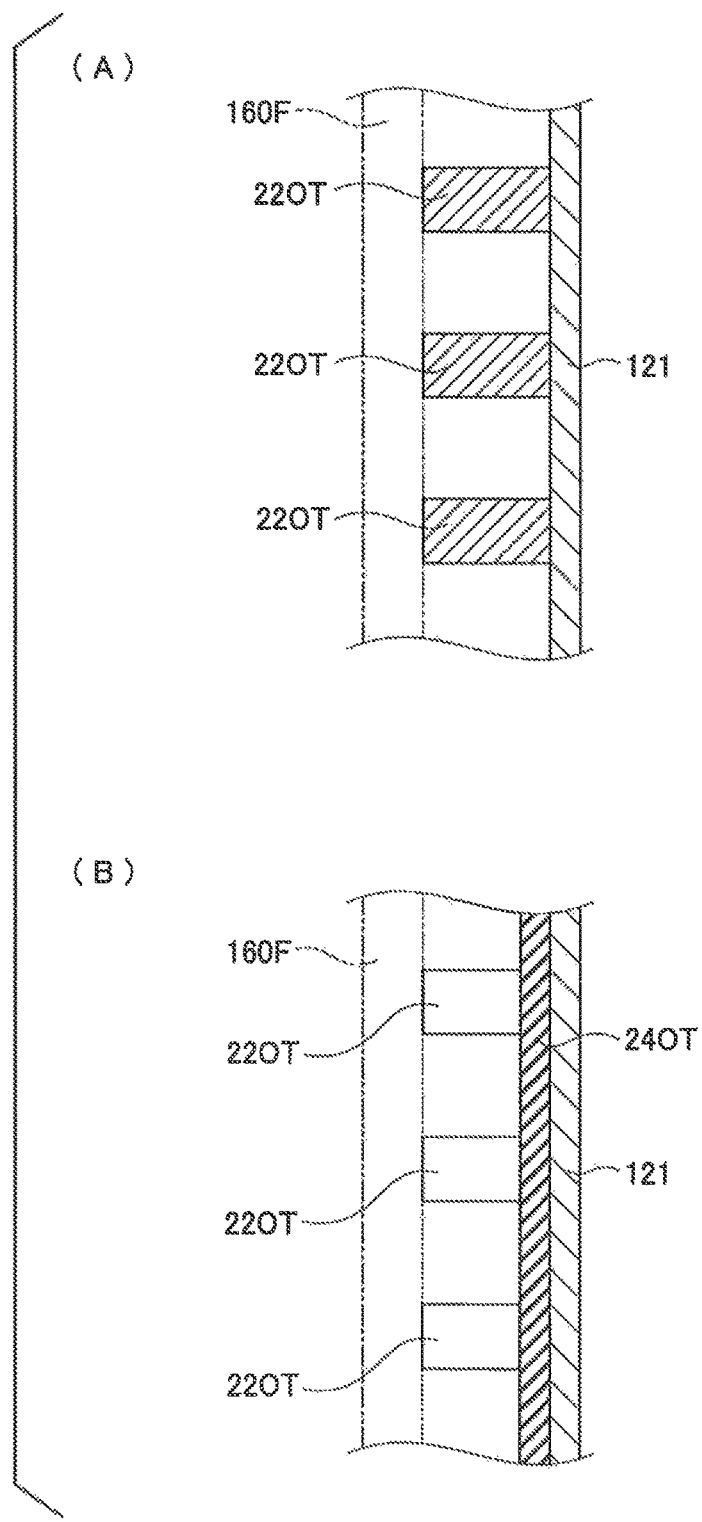
FIG. 4 is an illustrative diagram schematically showing a cross-sectional configuration of a flow rectifying portion of the first embodiment.

The first and second flow rectifying portions 20IN and 20OT will be described with reference to FIGS. 3 and 4. FIG. 4 is an illustrative diagram schematically showing a cross-sectional configuration of the flow rectifying portion. The (A) of FIG. 4 shows a cross-sectional view taken along line A-A in FIG. 3, and the (B) of FIG. 4 shows a cross-sectional view taken along line B-B in FIG. 3. In FIG. 4, the current collector plate 160F in contact with the cooling surface of the anode-side separator 120 is indicated by a 2-dot chain line. As shown in FIG. 3, in the cooling surface of the anode-side separator 120, the first flow rectifying portion 20IN is provided in the connection portion 27IN between the cooling water supply hole 126IN and the cooling water flow region 26, and the second flow rectifying portion 20OT is provided in the connection portion 27OT between the cooling water discharge hole 126OT and the cooling water flow region 26. Since the first flow rectifying portion 20IN and the second flow rectifying portion 20OT have the same shape, the second flow rectifying portion 20OT will be described below but the description of the first flow rectifying portion 20IN will be omitted.

As shown in FIG. 3, the second flow rectifying portion 20OT includes 12 protruded portions 22OT and a coupling portion 24OT, and the 12 protruded portions 22OT are coupled by the coupling portion 24OT. In FIG. 3, for convenience of the plane of the figure, part of the 12 protruded portions 22OT is identified with a symbol but a symbol for the other protruded portions 22OT is omitted. As shown in FIG. 3, the protruded portion 22OT is formed cylindrically (FIG. 4) in the planar shape of a rectangle with rounded corners (the shape consisting of two equal-length parallel lines and two semicircles). As shown in (B) of FIG. 4, the coupling portion 24OT is thinner than the protruded portions 22OT, and as shown in FIG. 3, is arranged on the side of the cooling water flow region 26 with respect to the protruded portions 22OT. Specifically, the coupling portion 24OT is formed with 12 branch portions that are extended from the protruded portions 22OT to the side of the cooling water flow region 26 parallel to the long side of the separator main body 121 and a stem portion that couples the branch portions. In the present embodiment, the protruded portions 22OT and the coupling portion 24OT are integrally formed by injection molding. In the coupling portion 24OT, a plurality of air removal holes (not shown) for discharging air at the time of injection molding are provided, and thus it is possible to form the second flow rectifying portion 20OT in an appropriate shape by injection molding.

As described above, the first and second flow rectifying portions 20IN and 20OT are formed of the same EPDM as the seal portions 302, 304 and 306. The first and second flow rectifying portions 20IN and 20OT and the seal portions 302, 304 and 306 are simultaneously formed by injection molding in the separator main body 121.

The cooling water supplied through the cooling water supply hole 126IN is rectified in flow by the first flow rectifying portion 20IN, is flowed in the cooling water flow region 26 along the cooling water flow path, is thereafter rectified in flow by the second flow rectifying portion 20OT and is discharged through the cooling water discharge hole 126OT.

A3. Effects of the First Embodiment

As described above, since in the fuel cell stack 10 of the first embodiment the first and second flow rectifying portions 20IN and 20OT are included, the flow of the cooling water through the connection portion 27IN between the cooling water supply hole 126IN and the cooling water flow region 26 and the flow of the cooling water through the connection portion 27OT between the cooling water flow region 26 and the cooling water discharge hole 126OT are rectified, and thus it is possible to appropriately flow the cooling water. Consequently, it is possible to reduce variations in the planar temperature of a power generation region and to reduce a decrease in the power generation performance of the fuel cell.

When, in the following description, it is not necessary to distinguish the first flow rectifying portion 20IN from the second flow rectifying portion 20OT, the first and second flow rectifying portions are collectively referred to as the "flow rectifying portions 20". Likewise, when it is not necessary to distinguish the protruded portion 22IN from the protruded portion 22OT, they are collectively referred to as the "protruded portions 22", and when it is not necessary to distinguish the coupling portion 24IN from the coupling portion 24OT, they are collectively referred to as the "coupling portions 24".

In the flow rectifying portion 20, since the protruded portions 22 having the function of performing flow rectifying are coupled by the coupling portions 24, as compared with a case where the 12 protruded portions 22 are provided independently of each other, an adhesion area adhered to the separator main body 121 is large, with the result that it is possible to reduce separation from the separator main body 121 caused by the pressure of the cooling water.

In the present embodiment, the coupling portion 24 is arranged on the side of the cooling water flow region 26 with respect to the protruded portion 22. Hence, as compared with a case where the coupling portion 24 is arranged between the protruded portions 22 so as to directly connect the area between the protruded portions 22 (in other words, the coupling portion 24 is arranged between the protruded portion 22 and the separator main body 121), it is possible to acquire the cross-sectional area (for example, the area between the protruded portions 22OT in the (A) of FIG. 4) of the flow path along which the cooling water flows, with the result that it is possible to reduce the inhibition of the distribution of the cooling water.

For example, when the 12 protruded portions 22 are formed independently of each other by injection molding, since it is necessary to provide the gates of a mold corresponding to the protruded portions 22, the mold is expensive. It is more likely that a molding failure occurs due to a failure of the gate balance in the mold. By contrast, in the present embodiment, since the flow rectifying portion 20 includes the coupling portion 24 which couples the 12 protruded portions 22, the gates corresponding to the protruded portions 22 are not necessary, and thus it is possible to reduce the cost of the mold. As compared with the case where the 12 protruded portions 22 are provided independently of each other, the flow rectifying portion 20 can be more easily formed by injection molding, and thus it is possible to reduce a failure rate. Since the flow rectifying portion 20 can be more easily formed by injection molding, the flow rectifying portion 20 can be formed simultaneously with the seal portions 302, 304 and 306, and thus it is possible to reduce the manufacturing steps. Consequently, it is possible to reduce the manufacturing time and the cost.

The anode-side separators of the second and third embodiments will be described below with reference to FIGS. 5 to 8. Since the configuration of the first and second flow rectifying portions differs from the first embodiment in the anode-side separators of the second and third embodiments but the other configurations are the same as those of the anode-side separator 120 in the first embodiment, the same symbols are used, and the description thereof is omitted.

B. Second Embodiment

Figure 5:
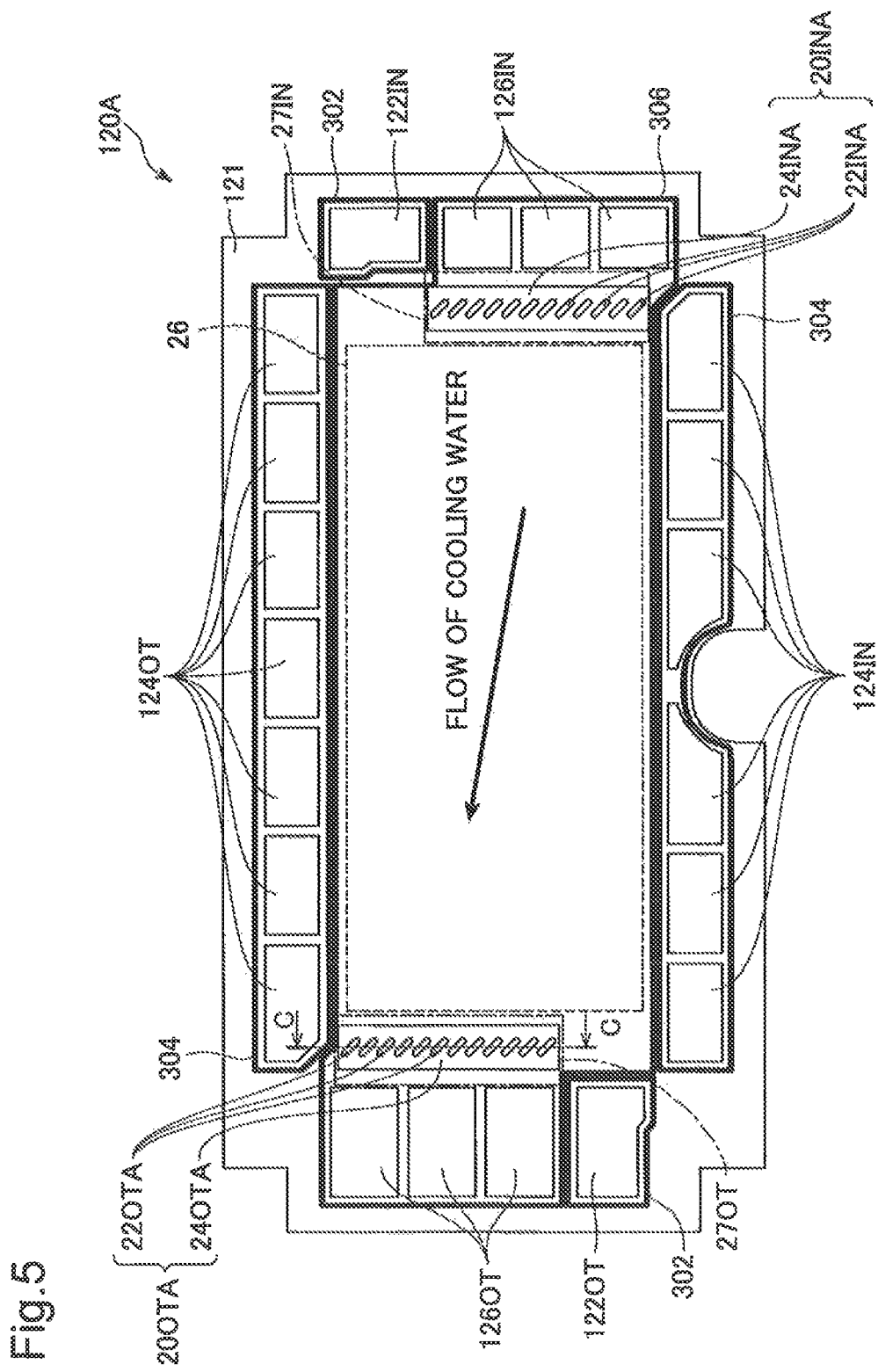
FIG. 5 is an illustrative diagram showing, in plan view, an anode-side separator of a second embodiment.

FIG. 5 an illustrative diagram showing, in plan view, the anode-side separator of the second embodiment. In FIG. 5, the cooling surface of the anode-side separator 120A is shown. In FIG. 5, as in FIG. 3, the illustration of the cooling water flow path is omitted. The cooling surface of the anode-side separator 120A in the second embodiment has a first flow rectifying portion 20INA in the connection portion 27IN between the cooling water supply hole 126IN and the cooling water flow region 26, and has a second flow rectifying portion 20OTA in the connection portion 27OT between the cooling water discharge hole 126OT and the cooling water flow region 26. Since the first flow rectifying portion 20INA and the second flow rectifying portion 20OTA have the same configuration, the second flow rectifying portion 20OTA will be described below but the description of the first flow rectifying portion 20INA will be omitted.

Figure 6:
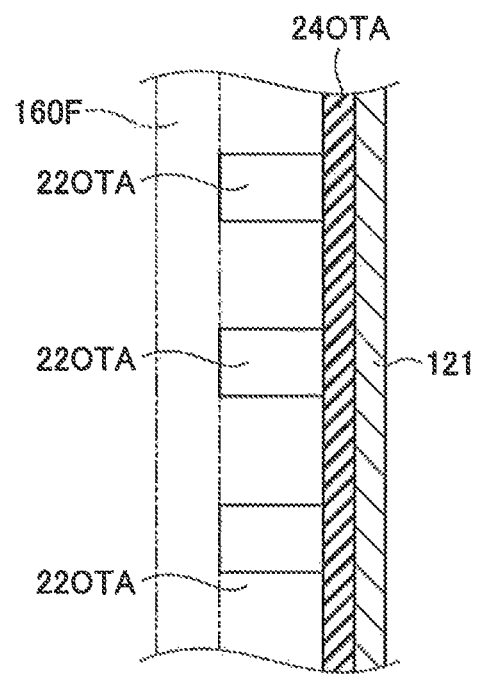
FIG. 6 is an illustrative diagram schematically showing a cross-sectional configuration of a second flow rectifying portion of the second embodiment.

FIG. 6 is an illustrative diagram schematically showing a cross-sectional configuration of the second flow rectifying portion in the second embodiment. FIG. 6 shows a cross-sectional view taken along line C-C in FIG. 5. In FIG. 6, the current collector plate 160F in contact with the cooling surface of the anode-side separator 120A is indicated by a 2-dot chain line. As shown in FIG. 5, the second flow rectifying portion 20OTA includes the 12 protruded portions 22OTA and the coupling portion 24OTA. In FIG. 5, for convenience of the plane of the figure, part of the 12 protruded portions 22OTA is identified with a symbol but a symbol for the other protruded portions 22OTA is omitted. The protruded portion 22OTA of the second embodiment has the same shape (its planar shape is a cylindrical shape of a rectangle with rounded corners) as the protruded portion 22OTA of the first embodiment. The coupling portion 24OTA differs from the first embodiment in that the coupling portion 24OTA is thinner than the protruded portion 22OTA, and that its planar shape is a rectangular plate shape. As shown in FIG. 6, the coupling portion 24OTA is arranged between the protruded portion 22OTA and the separator main body 121.

Even in the anode-side separator 120A of the second embodiment, since the flow rectifying portion 20A (the first and second flow rectifying portions 20INA and 20OTA) includes the coupling portion 24A (the coupling portions 24INA and 24OTA) that couples the 12 protruded portions 22A (the protruded portions 22INA and 22OTA), as in the first embodiment, it is possible to reduce separation from the separator main body 121. As in the first embodiment, since it is possible to relatively easily form the flow rectifying portion 20A by injection molding, it is possible to provide the effects of reducing the cost of the mold, the failure rate, the manufacturing steps, the manufacturing time and the cost. However, as compared with the anode-side separator 120 in the fuel cell stack 10 of the first embodiment, since the cross-sectional area of the flow path along which the cooling water flows is decreased, as the shape of the flow rectifying portion, the shape shown in the first embodiment is preferable in the distribution of the cooling water.

C. Third Embodiment

Figure 7:
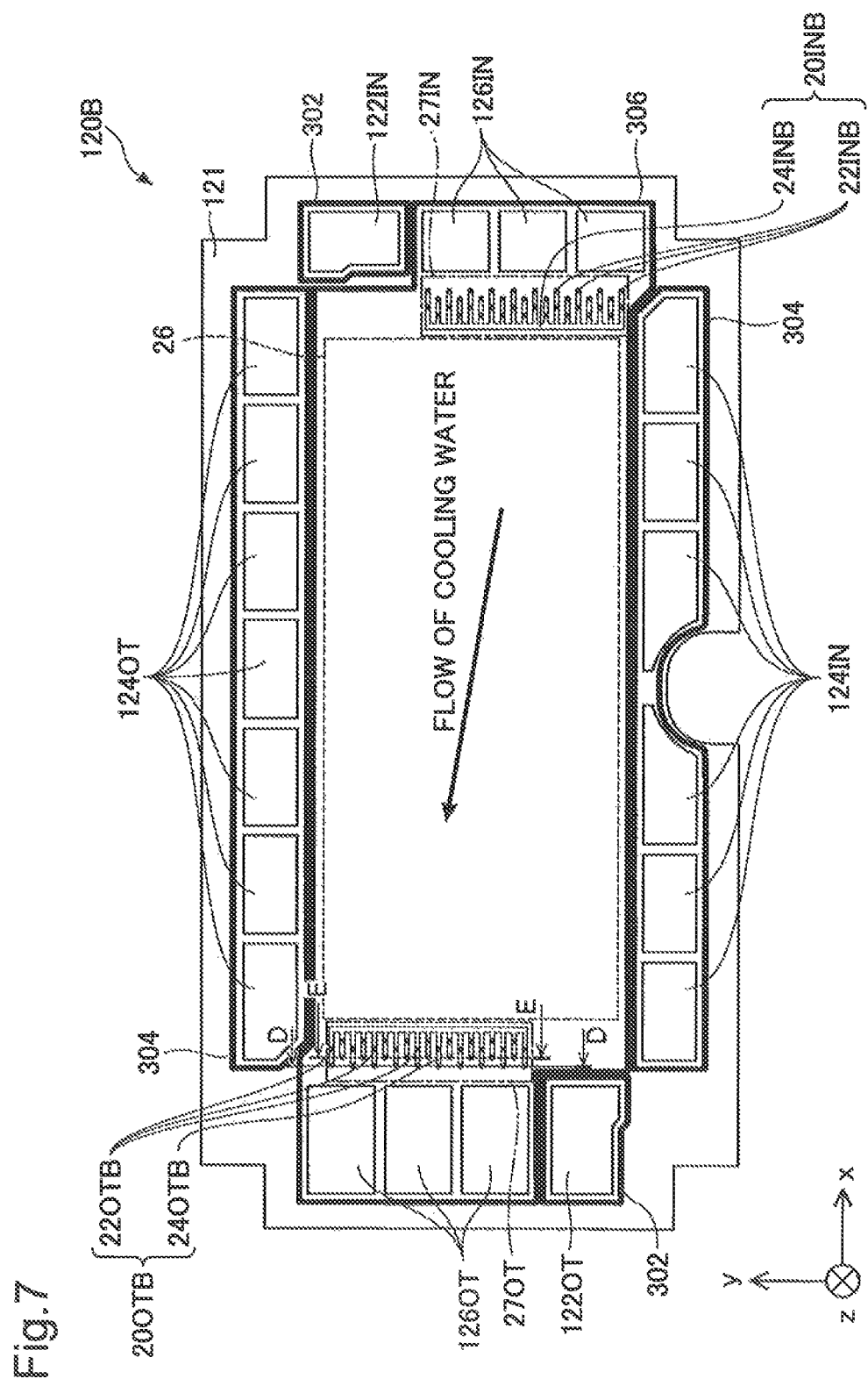
FIG. 7 is an illustrative diagram showing, in plan view, an anode-side separator of a third embodiment.

FIG. 7 an illustrative diagram showing, in plan view, the anode-side separator of the third embodiment. In FIG. 7, the cooling surface of the anode-side separator 120B is shown. In FIG. 7, as in FIG. 3, the illustration of the cooling water flow path is omitted. The cooling surface of the anode-side separator 120B in the third embodiment has the first flow rectifying portion 20INB in the connection portion 27IN between the cooling water supply hole 126IN and the cooling water flow region 26, and has the second flow rectifying portion 20OTB in the connection portion 27OT between the cooling water discharge hole 126OT and the cooling water flow region 26. Since the first flow rectifying portion 20INB and the second flow rectifying portion 20OTB have the same configuration, the second flow rectifying portion 20OTB will be described below but the description of the first flow rectifying portion 20INB will be omitted.

Figure 8:
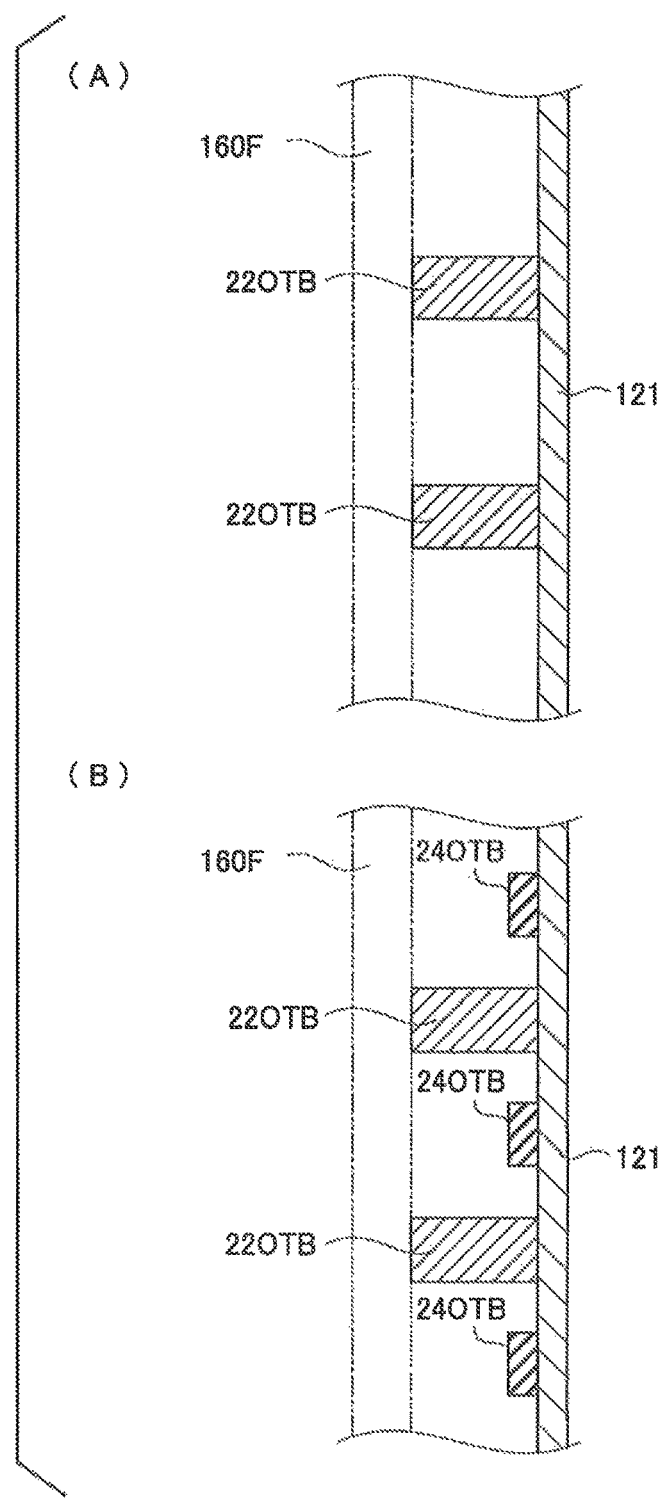
FIG. 8 is an illustrative diagram schematically showing a cross-sectional configuration of a second flow rectifying portion of the third embodiment.

FIG. 8 is an illustrative diagram schematically showing a cross-sectional configuration of the second flow rectifying portion in the third embodiment. (A) of FIG. 8 shows a cross-sectional view taken along line D-D in FIG. 7, and (B) of FIG. 8 shows a cross-sectional view taken along line E-E in FIG. 7. In FIG. 8, the current collector plate 160F in contact with the cooling surface of the anode-side separator 120 is indicated by a broken line. As shown in FIG. 7, the second flow rectifying portion 20OTB includes 38 protruded portions 22OTB and the coupling portion 24OTB. In FIG. 7, for convenience of the plane of the figure, part of the 38 protruded portions 22OTB is identified with a symbol but a symbol for the other protruded portions 22OTB is omitted. Unlike the protruded portion 22OT of the first embodiment, the protruded portion 22OTB of the third embodiment is formed cylindrically (FIGS. 7 and 8). With respect to the 38 protruded portions 22OTB, a total of 4 lines are aligned parallel to the short side of the separator main body 121 such that an A line in which 10 protruded portions 22OTB are aligned and a B line in which 9 protruded portions 22OTB are aligned are alternate. The protruded portions 22OTB in the A line and the protruded portions 22OTB in the B line are arranged so as to be alternate (the position in the y axis direction is displaced). As shown in (B) of FIG. 8, the coupling portion 24OTB is formed so as to be thinner than the protruded portion 22OTB, and as shown in FIG. 7, is arranged so as to protrude to the side of the cooling water flow region 26 with respect to the protruded portion 22OTB. Specifically, the coupling portion 24OTB is formed with a branch portion which is extended from the protruded portion 22OTB to the side of the cooling water flow region 26 parallel to the long side of the separator main body 121 and a stem portion which is coupled to the branch portion. The branch portion couples each protruded portion 22OTB in the same position in the y axis direction.

Even in the anode-side separator 120B of the third embodiment, since the flow rectifying portion 20B (the first and second flow rectifying portions 20INB and 20OTB) includes the coupling portion 24B (the coupling portions 24INB and 24OTB) that couples a plurality of protruded portions 22B (the protruded portions 22INB and 22OTB), as in the first embodiment, it is possible to reduce separation from the separator main body 121. As in the first embodiment, since it is possible to relatively easily form the flow rectifying portion 20B by injection molding, it is possible to provide the effects of reducing the cost of the mold, the failure rate, the manufacturing steps, the manufacturing time and the cost. In the present embodiment, since in the flow rectifying portion 20B the protruded portion 22B is cylindrical, directionality is not present, and thus it is possible to diffuse the cooling water in a broad direction.

D. Fourth Embodiment

Figure 9:
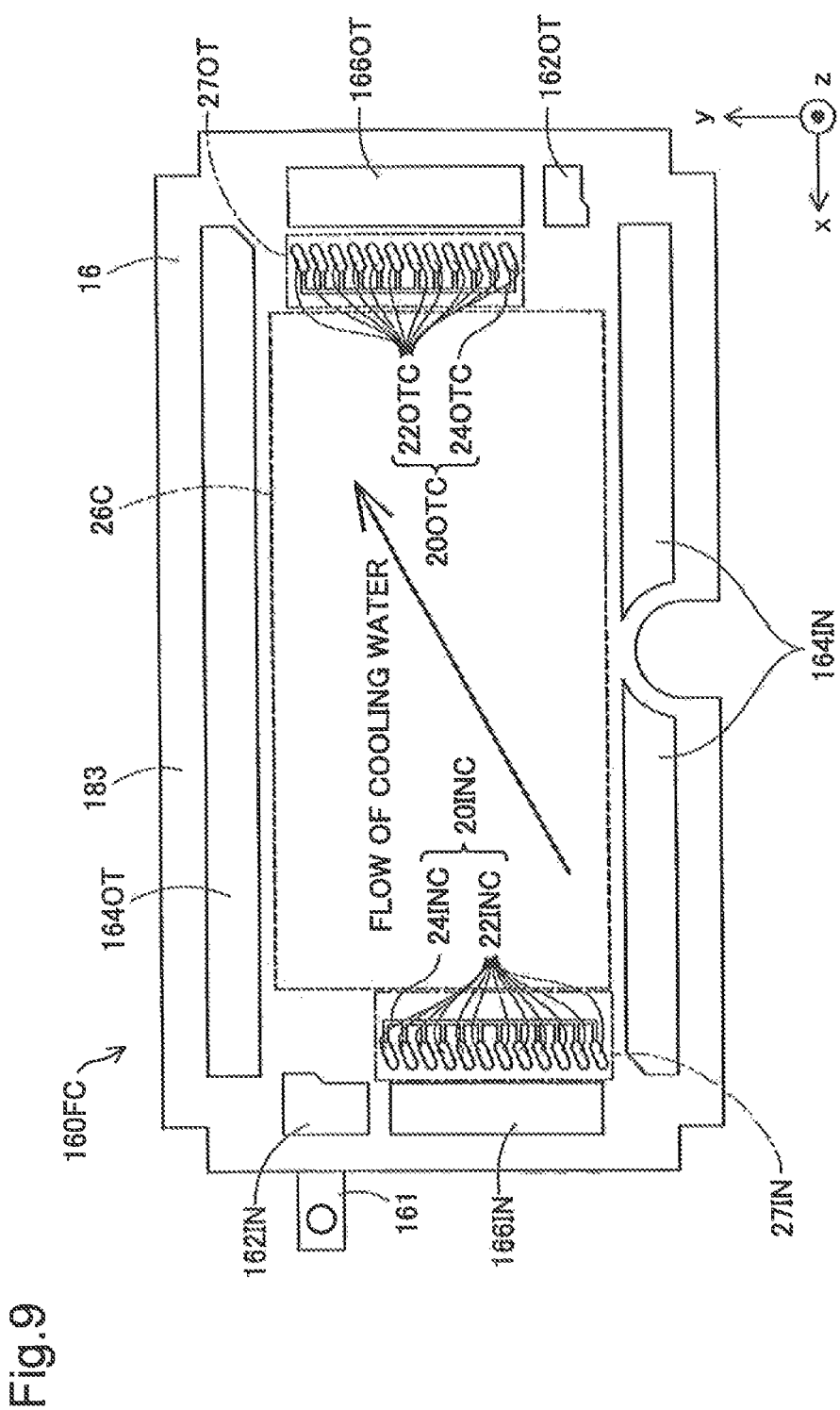
FIG. 9 is an illustrative diagram showing, in plan view, a current collector plate of a fourth embodiment.

FIG. 9 is an illustrative diagram showing, in plan view, a current collector plate of a fourth embodiment. FIG. 9 shows a surface which is in contact with the fuel cell 100 of the current collector plate 160FC on the front end side and in which the cooling water is flowed (hereinafter also referred to as the cooling surface). As shown in the figure, the current collector plate 160FC includes a current collector plate main body 16 formed of metal and first and second flow rectifying portions 20INC and 20OTC formed of rubber. The current collector plate main body 16 is a metal plate obtained by stacking, in layers, a metal plate formed of titanium on both surfaces of metal plates having the current collector terminal 161 and formed of aluminum. In the periphery portion of the current collector plate main body 16, a fuel gas supply hole 162IN and a fuel gas discharge hole 162OT, an oxidizing gas supply hole 164IN and an oxidizing gas discharge hole 164OT and a cooling water supply hole 166IN and a cooling water discharge hole 166OT are included. When a plurality of fuel cells are stacked in layers to form the fuel cell stack, these supply discharge holes function as a manifold which is connected to the supply discharge holes corresponding to the end plates and the fuel cells to supply the reactive gases and the cooling water to the fuel cells. The cooling surface of the current collector plate main body 16 has a cooling water flow region 26C in a part surrounded by the supply discharge holes described above. When the current collector plate 160FC of the present embodiment is used to form the fuel cell stack, the cooling surface of the current collector plate 160FC is in contact with the cooling surface of the separator of the fuel cell. A cooling water flow path formed in the cooling surface of the separator is in contact with the cooling water flow region 26C of the current collector plate 160FC, and the cooling water is flowed along the cooling water flow path in the cooling water flow region 26C of the current collector plate 160FC. The cooling water flow region 26C and the cooling water supply hole 166IN and the cooling water discharge hole 166OT in the present embodiment correspond to the fluid flow region and the through-holes in claims, respectively.

The cooling surface of the current collector plate 160FC has the first flow rectifying portion 20INC in the connection portion 27IN between the cooling water supply hole 166IN and the cooling water flow region 26C, and has the second flow rectifying portion 20OTC in the connection portion 27OT between the cooling water discharge hole 166OT and the cooling water flow region 26C. The first flow rectifying portion 20INC and the second flow rectifying portion 20OTC have the same shape as the first flow rectifying portion 20IN and the second flow rectifying portion 20OT in the first embodiment.

When the current collector plate 160FC of the present embodiment is used to form the fuel cell stack, since the first and second flow rectifying portions 20INC and 20OTC are included, the flow of the cooling water between the cooling water supply hole 166IN and the cooling water flow region 26C and the flow of the cooling water between the cooling water flow region 26C and the cooling water discharge hole 166OT are rectified, and thus it is possible to appropriately flow the cooling water. When the current collector plate 160FC of the present embodiment is used to form the fuel cell stack, the separator in contact with the current collector plate 160FC may not include the flow rectifying portion in the cooling surface.

Even in the current collector plate 160FC of the fourth embodiment, since the flow rectifying portion 20C (the first and second flow rectifying portions 20INC and 20OTC) includes the coupling portion 24C (the coupling portions 24INC and 24OTC) which couples the 12 protruded portions 22C (the protruded portions 22INC and 22OTC), as in the first embodiment, it is possible to reduce separation from the current collector plate main body 16. Since as in the first embodiment, it is possible to relatively easily form the flow rectifying portion 20C by injection molding, it is possible to provide the effects of reducing the cost of the mold, the failure rate and the cost. Although in the present embodiment, no seal portion is formed around the supply discharge holes of the current collector plate 160FC, seal portions formed of rubber may be provided around the supply discharge holes of the current collector plate 160FC, and the seal portions and the flow rectifying portion 20C may be formed simultaneously by injection molding. When the seal portions are provided around the supply discharge holes of the current collector plate 160FC, the separator in contact with the current collector plate 160FC may not include the seal portions around the supply discharge holes of the cooling surface.

E. Variations

This invention is not limited to the embodiments described above, and the invention is possible in various aspects without departing from the spirit thereof. For example, the technical features of the embodiments corresponding to the technical features in the aspects described in the section of Summary of the Invention can be replaced or combined as necessary so that part or the whole of the problem described previously is solved or part or the whole of the effects described previously is achieved. When the technical features are not described as necessary features in the present specification, they can be deleted as necessary. For example, the following variations are possible.

(1) Although in the embodiments described above, the example where the flow rectifying portion for rectifying the flow of the cooling water is provided in the cooling surface of the anode-side separator is described, the target in which the flow rectifying portion is formed and the fluid that is rectified in flow by the flow rectifying portion are not limited to the embodiments described above. For example, in the surface (hereinafter also referred to as a "gas surface") in contact with the MEA of the anode-side separator, a flow rectifying portion for rectifying the flow of the fuel gas may be provided. In this case, the flow rectifying portion is provided between the gas surface of the anode-side separator and a region (hereinafter referred to as a fuel gas flow region) in which the fuel gas is flowed and the fuel gas supply hole, and between the fuel gas flow region and the fuel gas discharge hole. In this case, the fuel gas flow region corresponds to the fluid flow region in the claims, and the fuel gas supply hole and the fuel gas discharge hole correspond to the through-holes in the claims. Likewise, in the surface (hereinafter also referred to as a "gas surface") in contact with the MEA of the cathode-side separator, the flow rectifying portion for rectifying the flow of the oxidizing gas may be provided. In this case, the flow rectifying portion is provided in the connection portion between a region (hereinafter referred to as an oxidizing gas flow region) in which the oxidizing gas is flowed in the gas surface of the cathode-side separator and the oxidizing gas supply hole, and in the connection portion between the oxidizing gas flow region and the oxidizing gas discharge hole. In this case, the oxidizing gas flow region corresponds to the fluid flow region in the claims, and the oxidizing gas supply hole and the oxidizing gas discharge hole correspond to the through-holes in the claims. In the cooling surface of the cathode-side separator, as in the embodiments described above, the flow rectifying portion for rectifying the flow of the cooling water may be provided. When the fuel cell stack is provided, the flow rectifying portion for rectifying the flow of the cooling water may be provided in either of the anode-side separator and the cathode-side separator. Although in the embodiments described above, the example where the flow rectifying portion is provided both between the cooling water supply hole and the cooling water flow region and between the cooling water discharge hole and the cooling water flow region is described, the flow rectifying portion may be provided only in either of the supply or and the discharge side. Even in this way, it is possible to rectify at least either of the flows of the cooling water. The same is true for the fuel gas and the oxidizing gas.

(2) The shape of the flow rectifying portion is not limited to the embodiments described above. For example, although in the first embodiment, the shape of the protruded portion 22 is the cylindrical planar shape of a rectangle with rounded corners (the shape consisting of two equal-length parallel lines and two semicircles), the shape of the protruded portion 22 may be the cylindrical shape of a rectangle with rounded corners whose corner R (the radius of the rounded corners) is smaller than in the first embodiment. The shape of the protruded portion 22 may be the shape of another polygonal column with rounded corners, the shape of a quadrangular column or the shape of a polygonal column. The outline of the planar shape may not the shape of straight lines (substantially rectangular shape) but may be the shape of curved lines or polygonal lines. The number of protruded portions is not limited to the embodiments described above. The shape of the coupling portion is also not limited to the embodiments described above and, for example, without the branch portion in the first embodiment being included, the protruded portions may be coupled with the stem portion. Although in the embodiments described above, the example where the coupling portion is arranged on the side of the cooling water flow region with respect to the protruded portion is described, the coupling portion may be arranged on the side of the supply discharge holes with respect to the protruded portion.

(3) Although in the embodiments described above, the example where the flow rectifying portion is formed of ethylene-propylene-diene rubber (EPDM) is described, the material is not limited to the embodiments described above. For example, nitrile rubber (NBR), fluorine rubber (FKM) and the like may be used. The material is not limited to rubber, and other resin materials having a sealing property, elasticity and an adhesion property may be used. Materials other than resin (such as metal) may be used. When a material having a low adhesion property is used to form the flow rectifying portion, the flow rectifying portion may be adhered to the separator main body with an adhesive. A resin material having a sealing property, elasticity and an adhesion property is preferably used because it can be directly formed on the separator main body by injection molding.

(4) Although in the embodiments described above, the example where the seal portions formed around the supply discharge holes and the flow rectifying portion are simultaneously formed of the same material by injection molding is described, the seal portion and the flow rectifying portion may not be formed simultaneously. They may also be formed of different materials.

What is claimed is:

1. A current collector plate used in a fuel cell, the current collector plate comprising:
   a current collector plate main body that includes a coolant flow region through which a coolant flows, a through-hole which is arranged around the coolant flow region apart from the coolant flow region and through which the coolant flows, and a connection portion which connects the coolant flow region and the through-hole; and
   a flow rectifying portion that is arranged by being adhered on the connection portion and that rectifies flow of the coolant between the coolant flow region and the through-hole,
   wherein the flow rectifying portion includes a plurality of protruded portions and a coupling portion which is thinner than the protruded portions and which couples the protruded portions, and
   wherein the coupling portion includes:
   branch portions extending from each of the protruded portions to the coolant flow region, and
   a stem portion that couples the branch portions.

2. A fuel cell stack comprising:
   a stacked body configured by stacking a plurality of fuel cells; and
   the current collector plate according to claim 1.

* * * * *